(12) United States Patent
Jackson et al.

(10) Patent No.: US 8,291,475 B2
(45) Date of Patent: Oct. 16, 2012

(54) SECURE CROSS-DOMAIN COMMUNICATION FOR WEB MASHUPS

(75) Inventors: Collin Jackson, Seattle, WA (US); Jiahe Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 12/112,800

(22) Filed: Apr. 30, 2008

(65) Prior Publication Data

US 2009/0276835 A1 Nov. 5, 2009

(51) Int. Cl.
G06F 21/00 (2006.01)

(52) U.S. Cl. ......... 726/4; 726/2; 726/3; 726/27; 726/28; 726/29; 726/30; 709/203; 709/217; 709/218; 709/219; 713/182; 713/183; 713/184; 713/185

(58) Field of Classification Search .................. 726/2–8, 726/27–30; 709/225, 229, 203, 217–219; 715/240, 760

See application file for complete search history.

(56) References Cited

U.S. PATENT DOCUMENTS

| | | | | |
|---|---|---|---|---|
| 6,085,229 A * | 7/2000 | Newman et al. | ............... | 709/203 |
| 6,944,829 B2 * | 9/2005 | Dando | ........................... | 715/798 |
| 6,981,247 B2 * | 12/2005 | Weinberg et al. | ............. | 717/127 |
| 7,293,034 B2 | 11/2007 | Paya et al. | | |
| 7,865,544 B2 * | 1/2011 | Kordun et al. | ................ | 709/200 |
| 2004/0210536 A1 | 10/2004 | Gudelj et al. | | |
| 2006/0010134 A1 | 1/2006 | Davis et al. | | |
| 2006/0212514 A1 * | 9/2006 | Saillet | ............................ | 709/203 |
| 2007/0006148 A1 | 1/2007 | Varshney et al. | | |
| 2007/0067465 A1 * | 3/2007 | Blinn et al. | ................... | 709/229 |
| 2007/0101258 A1 | 5/2007 | Xu et al. | | |
| 2007/0113237 A1 | 5/2007 | Hickson | | |
| 2007/0150603 A1 | 6/2007 | Crull et al. | | |
| 2007/0245008 A1 * | 10/2007 | Matsui et al. | ................. | 709/223 |
| 2007/0256003 A1 | 11/2007 | Wagoner et al. | | |
| 2008/0104531 A1 * | 5/2008 | Stambaugh | ................... | 715/771 |
| 2008/0154873 A1 * | 6/2008 | Redlich et al. | ..................... | 707/5 |
| 2008/0281869 A1 * | 11/2008 | Liu et al. | .................... | 707/104.1 |

OTHER PUBLICATIONS

Collin et al, Secure Cross-Domain Communication for Web Mashups, May 8-12, 2007.*
Howell, et al., "MashupOS: Operating System Abstractions for Client Mashups", In Proc. of the 11th Workshop on Hot Topics in Operating Systems. (HotOS 2007). 11 Pages.
Wang, et al., "Protection and Communication Abstractions for Web Browsers in MashupOS", SOSP'07, Oct. 14-17, 2007, Stevenson, Washington, USA. 15 Pages.

(Continued)

*Primary Examiner* — Taghi Arani
*Assistant Examiner* — Josnel Jeudy
(74) *Attorney, Agent, or Firm* — Lyon & Harr, L.L.P.; Craig S. Fischer

(57) ABSTRACT

A secure cross-domain communication system and method for facilitating secure communication between a website having a web mashup and websites having content that is to be placed on the web mashup. Embodiments of the system and method set the document domain variable of the mashup website and the websites to facilitate the secure communication. Mediator frames are used as an intermediary between a top frame (containing the web mashup) and untrusted frames (containing the website content to be included in the mashup). The type of setup technique used is dependent on the number of websites being used in the mashup. Once the secure communication is established, data exchange between the top frame and the untrusted frame is dependent on the types of services that that the browser supports.

13 Claims, 11 Drawing Sheets

OTHER PUBLICATIONS

Keukelaere, et al., "SMash: Secure Cross-Domain Mashups on Unmodified Browsers" Computer Science; Security, Research Report. IBM Research Division. Jun. 11, 2007. 16 Pages.

Reiss, "Improving the Security and Robustness of Modern Web Browsers", General Exam Report, University of Washington, May 2007. pp. 1-15.

"CrossSafe" Webpage Available at: http://www.xucia.com/Cross-Safe/readme.html.

Fournet, et al., "Stack Inspection: Theory and Variants", POPL '02, Jan. 1618, 2002 Portland, OR USA. pp. 307-318.

Jackson, et al., "Protecting Browser State from Web Privacy Attacks", WWW 2006, May 23-26, 2006, Edinburgh, Scotland. 8 Pages.

Reis, et al., "BrowserShield: Vulnerability-Driven Filtering of Dynamic HTML", OSDI '06. pp. 61-74 of the Proceedings.

* cited by examiner

| Browser Configuration | | | Supported Server Techniques | | | |
|---|---|---|---|---|---|---|
| Browser | Cross-domain frame access | Closure authorization | TUA + callback | TMU + callback | TUA + polling | TMU + polling |
| IE6 (default) | permissive | static | ✓ | | ✓ | |
| IE6 (restrictive) | restrictive | static | ✓ | ✓ | ✓ | |
| IE7 | permissive | static | ✓ | | ✓ | |
| Firefox | permissive | static | | | | |
| Opera | restrictive | dynamic | | | ✓ | ✓ |
| Safari | permissive | dynamic | | | ✓ | ✓ |

FIG. 7

SECURE CROSS-DOMAIN COMMUNICATION FOR WEB MASHUPS

BACKGROUND

A web mashup is a website or web application that seamlessly combines content (such as data and code) from multiple sources (which may even be competing sources) into an integrated experience for a user. For example, a real estate website may combine map data from one website with housing data from another website to present an integrated view of housing prices at various locations on a map. Web mashups may also involve gadgets, which are miniature objects offering dynamic content that can be placed on any page on the web. Gadget aggregators (such as Microsoft® Windows Live) aggregate gadgets into a single page to provide a desirable, single-stop information presentation to their users.

In order for mashups to bring together content from multiple sources, they need to circumvent the security measures contained in browsers. Security measures, such as the same-origin web security model, allow web browser users to view interactive content without completely trusting the owner of that content. This security model keeps an untrusted web page from observing or corrupting the user's actions at other sites and from issuing unwanted transactions on behalf of the user. The same-origin web security model states that "only the site that stores some information in the browser may read or modify that information."

The same-origin web security model restrictions that are of greatest interest to web mashups are script (for example, JavaScript®, ECMAScript, and Jscript®) restrictions that regulate access to inline frames (IFRAMEs) and the XML-HttpRequest object. An IFRAME is an HTML element that makes it possible to embed another HTML document inside the main document. The embedded document can be a different document from the main document, and can be embedded without reloading the main document.

Inline frames can be used to download rich HTML documents from outside sources, but if the content comes from a different domain the browser will not allow the script in the containing page to read or manipulate the document inside the frame, and vice versa. The XML-HttpRequest can be used to download arbitrary XML documents without rendering them in a browser pane, but it cannot be used to download files that are not from the same domain as the page making the request. By enforcing these restrictions, the script same-origin policy protects the secrecy of HTML documents that the user has access to, and also protects the integrity of a page against unauthorized modifications by other pages.

Web developers often are forced to choose between security and functionality. Functionality is improved when unfettered access is giving to websites. However, this approach incurs high security risks because one site gets complete control over the other. Moreover, the browser can be extended with plug-ins for cross-domain interactions. This approach has the disadvantage of being inconvenient for users whose browsers are not supported by the plug-in or who are unwilling to install new software.

One current technique used by mashups to communicate across domains is by using proxies. The website hosting the mashup can host a URL which relays data between the client and the source of the data. These proxies (sometimes known as bridges) make the data appear to the client to be "same-origin" data, so that the browser allows this data to be read back out of an IFRAME, or more commonly, an XMLHttpRequest. One disadvantage of this approach is that it adds the latency of connecting through a mashup's proxy server, which generally takes longer than connecting directly to the server hosting the data. In addition, bandwidth costs for the mashup author are increased by the proxy approach, particularly if the size of the mashup's code is small relative to the amount of cross-domain data being proxied. Moreover, although these proxies only go to one place, because they are left open for anyone to use, they provide another layer for hackers to hide behind for denial of service or exploiting input validation vulnerabilities on the server hosting the data source.

Another technique used by mashups to communicate across domains is cross-domain script tags. The same-origin policy on script protects HTML documents loaded from other domains, but it does not apply to scripts, which can be loaded from other domains and executed with the privileges of the page that included them. These remote scripts can be added to a page dynamically, allowing new data to be loaded into part of a page without forcing the entire page to be loaded. Unlike an XMLHttpRequest, which provides full read access to the content being requested, a script can only be accessed by executing it. This restriction ensures that only valid script files can be accessed across domain boundaries, while all other files (such as HTML documents) will cause a syntax error.

One disadvantage of using cross-domain script tags is that execute-only access requires that the page including the script fully trusts the source of the script. Another disadvantage is that the page including the script has no way of performing input validation to ensure that the script being retrieved is not misusing its access to the parent page. The site hosting the script could change the content of the script at any time, and could even serve different scripts to different users. Other cross-domain tags that can transmit information include stylesheets, which have the same security issues as scripts, and images, which can transmit limited information through height and width.

Another technique used by mashups to communicate across domains is by using fragment identifier messaging. Each browser has certain objects in the browser that can be accessed despite that object belonging to another domain. One example is the window.location object, which can be set (but not read) by frames of another origin. Thus, if a frame from Site A can access a frame of a page from Site B, it can pass a message to Site B by setting the location of Site B's page to be equal to Site B's current location plus a fragment identifier (starting with #). Because browsers do not reload the page when navigating to a fragment, the Site B page is not interrupted, but can receive the message without any network requests being sent. This technique is known as fragment identifier messaging, and has been used by some mashups to pass information on the client side between frames. Unfortunately, fragment identifier messaging requires careful synchronization between the communicating pages, and can be easily disrupted if the user presses the browser's back button.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the secure cross-domain communication system and method combine cross sub-domain communication with dynamic script insertion to get true cross-domain communication. This cross-domain communication is performed in a controlled manner that avoids the excessive trust requirements of dynamic script insertion. Embodiments of the system and method allow secure communication between one or more untrusted cross-domains to facilitate a web mashup at a certain website that is viewed in a browser. The website has a top frame (that has a location bar) and a number of smaller frames that include the components of the mashup, including web components and gadgets. The operation of the secure cross-domain communication system is highly dependent on the type of browser that is being used. Embodiments of the system and method provide secure cross-domain communication without modifying the browser.

Browsers are poorly designed to pass data between domains, often forcing web developers to abandon security in the name of functionality. Embodiments of the secure cross-domain communication system and method allow efficient communication across domains without sacrificing security. The system and method require only a small script library, and work across all major browsers. This allows embodiments of the system and method to serve as a secure communication primitive for web mashups. The primitive uses existing browser features as building blocks and is therefore is highly practical.

Embodiments of the secure cross-domain communication system and method include determining whether the mashup uses a single website or multiple websites. If using a single website, a single web site setup technique is used. This technique creates a mediator frame that provides secure communications between a top frame (containing the web mashup) and an untrusted frame (containing the untrusted website content). Secure communication is achieved by setting a document domain variable of the various frames.

Once the secure communication is established, data exchange between the top frame and the untrusted frame is dependent on which type of cross-domain code authorization the browser supports. If the browser supports a static authorization, then either a callback technique or a polling technique can be used to exchange data. On the other hand, if the browser supports a dynamic authorization, then the polling technique is used to exchange data.

If the web mashup using multiple websites, the type of setup technique used depends on the type of cross-domain frame access the browser supports. If the browser supports a restrictive frame access, then a top-mediator untrusted (TMU) setup technique is used that is similar to the single website setup technique except that a mediator frame is created for all untrusted frames. If the browser supports a permissive frame access, a top-untrusted access (TUA) setup technique is used. The TUA setup technique uses a single mediator frame and multiple access frames and untrusted frames. Similar to the other setup techniques, the document domain variable of the frames is used to allow secure communication between the top frame and the multiple untrusted frames.

Once the setup technique for the multiple websites is completed, the data exchange is similar to the single website situation. If the browser supports a static authorization, then either a callback technique or a polling technique can be used to exchange data. The callback technique uses a dynamic closure function to dynamically insert a script tag into the untrusted frames that point to data hosted on the untrusted website. A data response callback function is used to return data to the top frame after the script tag has loaded data from the untrusted website. If the browser supports a dynamic authorization, then the polling technique is used to exchange data. The polling technique polls a property of a communication object using a setinterval function to determine whether the untrusted website has data to send. In this manner, data is transferred between the web mashup and each of the multiple websites.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 7 is a table illustrating an exemplary embodiment of browser configurations and the server communication techniques that they can safely support.

DETAILED DESCRIPTION

Figure 1:
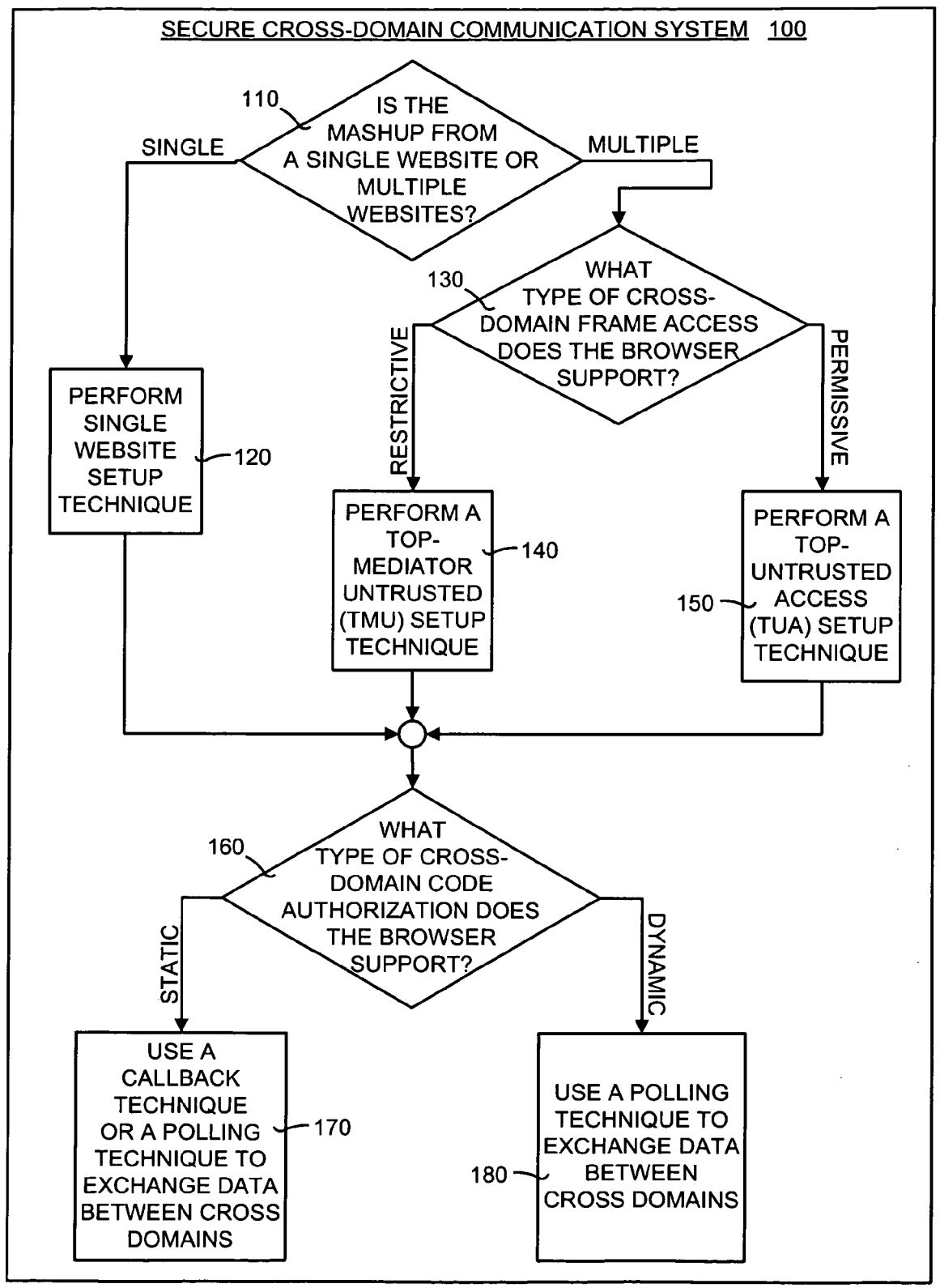
FIG. 1 is a flow diagram illustrating a general overview of embodiments of the secure cross-domain communication system and method disclosed herein.

In the following description of embodiments of the secure cross-domain communication system and method reference is made to the accompanying drawings, which form a part thereof, and in which is shown by way of illustration a specific example whereby embodiments of the secure cross-domain communication system and method may be practiced. It is to be understood that other embodiments may be utilized and structural changes may be made without departing from the scope of the claimed subject matter.

I. Building Blocks of the Secure Cross-Domain Communication System

Before giving an overview and delving into the details of embodiments of the secure cross-domain communication system and method, the building blocks used by the system and method will be discussed.

I.A Cross Sub-Domain Communication

One fuzzy aspect of the same-origin web security model is the notion of a "site." For purposes of script security, a site is defined as the triple given by protocol, name of the host, and the port (protocol, hostname, port). For example, http://a.example.com and http://b.example.com are considered to be different sites, while http:www.example.com/a and http:www.example.com/b are considered to be the same site. However, if two domains that want to communicate share a common suffix, they can use the script document.domain property to give each other full access to one another. Typically, all pages on different hosts have the domain property explicitly set to the same value to communicate successfully with each other. This document domain variable defaults to the host name of the server that the document was retrieved from, but can be truncated to a suffix (and only a suffix) of this name. Typically, the truncation occurs on dot-aligned boundaries. For example, pages on a.example.com and b.example.com can change the value of the document domain variable to example.com, allowing them to pass script data and code between each other at runtime.

Once a page has shortened its domain using the document domain variable, the page is no longer permitted to access other frames that do not match its new domain. Furthermore, the page cannot set its document domain variable back to its original value. In some browsers, the domain can never go from a shorter value to a longer value, but Microsoft®'s Internet Explorer® 7 allows the domain to be lengthened as long as it is not lengthened all the way back to its original value. On some browsers, the page can still make XMLHttpRequests back to its original domain (but not the new one). Typically, changing the document domain variable to top level domain names (such as "com") is not allowed, preventing this technique from being used for communication with arbitrary domains. However, techniques described below and used by embodiments of the secure cross-domain communication system and method allow sites to work around this restriction.

I.B Cross-Domain Code Authorization

Normally, the same-origin web security model prevents code from passing between domains. A function defined in one domain will not be called by code in another domain, so there is no ambiguity about which domain is performing an action when the same-origin security checks are applied. However, using the document domain variable technique described above, functions can be passed between domains.

A closure function is a function that refers to free variables in its lexical context. The closure function is associated with an environment that binds those variables. Typically, a closure function is defined within the body of another function, referencing variables that were in scope when it was created, but are not in scope when it is called.

An example of a closure function is this function, which returns the height of the current document in the user's web browser:

function h( ) {return document.body.clientHeight;}

This closure function would provide a useful service if provided by a child frame to its parent frame, because it would allow the parent frame to find out the height of the child frame, ensuring that all of its contents are visible and no scrolling is necessary.

By setting the document domain variable, a web page could pass a closure function to a frame in another domain. The ECMAScript specification does not provide an authorization policy for such closure functions, so browser vendors have arbitrarily picked their own behavior for this situation. There are two reasonable solutions, each of which has some adoption.

A first solution is dynamic cross-domain code authorization, whereby the closure function inherits the security privileges of the page that is calling it. This approach corresponds to following the control links of the call stack, in a manner similar to stack inspection. For example, if Site A calls a closure function that was obtained from Site B, the closure function would be able to access any browser state (DOM objects, cookies) associated with Site A, but not Site B. This is dynamic approach is adopted in browsers such as Opera® and Safari®.

A second solution is static cross-domain code authorization, whereby the closure function inherits the security permissions of the page where the closure was created. This approach can be implemented by following the function's access link instead of the control link. For example, if Site A calls a closure function that was obtained from Site B, the closure function would be able to access any browser state associated with Site B, but not Site A. This static approach is adopted in browsers such as Internet Explorer® and Firefox®.

Static cross-domain code authorization allows for greater flexibility in delegation and asynchronous event-driven communication than its dynamic counterpart. Static authorization allows one domain to provide another with callbacks, eliminating the need for polling, as discussed below. In contrast, invoking a closure function passed from an untrusted domain is unsafe in dynamic authorization browsers, because the closure function might abuse the caller's privileges.

Dynamic cross-domain code authorization can be simulated in a static authorization browser by calling the eva/ function on string data received from another site. However, the reverse is not true. In other words, static authorization cannot be easily simulated in a dynamic authorization browser.

I.C Cross-Domain Frame Access

Another security feature that differs across browsers is the cross-domain frame access policy for the frames property of each window. In a web page that includes nested frames from various domains, sometimes two frames that are not in a direct parent-child relationship would like to communicate with each other. Code running in one frame needs to navigate the frame hierarchy of the page in order to reach the other frame. Several different browser policies have been enforced on this behavior.

1. Permissive Policy: Firefox® and Safari® browsers will allow the frame structure of the page to be navigated so that the cross-domain frame can find another frame in the same domain.
2. Restrictive Policy: Opera® does not allow access to the frames object of a cross-domain frame, preventing the frame structure of the page from being navigated.
3. Configurable Policy: Internet Explorer® provides an advanced security setting called "Navigate sub-frames across different domains," which can be enabled, disabled, or set to prompt on every access. In Internet Explorer® 6, this setting is enabled by default. When enabled, the browser behaves like Firefox® and Safari®, and when disabled the browser behaves like Opera®.
4. Permissive policy, but restrict location: Internet Explorer® 7 also provides the "Navigate sub-frames across different domains," which is disabled by default. Unlike Internet Explorer® 6, this setting does allow or prevent accessing the hierarchy of cross-domain frames in order to find a same-domain frame. Instead, this setting controls the browser behavior when Site A frame sets the location property of a Site B frame. When enabled, the location property may be set normally. When disabled, setting the location property causes a new window to open at that location. The change in Internet Explorer® 7 has restricted some types of fragment identifier messaging. In any case, regardless of whether the setting is enabled or disabled, Internet Explorer® 7 will allow the frame structure of the page to be navigated so that the cross-domain frame can find another frame in the same domain.

II. Operational Overview

FIG. 1 is a flow diagram illustrating a general overview of embodiments of the secure cross-domain communication system and method disclosed herein. It should be noted that the implementation shown in FIG. 1 is only one of many implementations that are possible. Referring to FIG. 1, the secure cross-domain communication system 100 and method are shown implemented in a computing environment. It should be noted that this computing environment may include a computing device (not shown) having a single processor (such as a desktop or laptop computer) or several processors and computers connected to each other.

In general, the secure cross-domain communication system 100 allows secure communication between one or more untrusted cross-domains to facilitate a web mashup at a certain website that is viewed in a browser. The website has a top frame (containing a location bar) and a number of smaller frames that include the components of the mashup, including web components and gadgets. As will be seen below, the operation of the secure cross-domain communication system 100 is highly dependent on the type of browser that is being used. This is because the secure cross-domain communication system 100 seeks to provide secure cross-domain communication without modifying the browser.

The operation of the secure cross-domain communication system 100 includes determining whether the web mashup will use a single website domain or multiple website domains (box 110). If the mashup uses a single website domain, then a single website setup technique is performed (box 120). This single website setup technique is described below.

If the mashup uses multiple website domains, then another determination is made before deciding on which setup technique to use. Namely, a determination is made as to which type of cross-domain frame access the browser supports (box 130). If the browser supports restrictive cross-domain frame access, then a top-mediator untrusted (TMU) setup technique is performed (box 140). If the browser supports permissive cross-domain frame access, then a top-untrusted access (TUA) setup technique is used (box 150). Both the TMU and the TUA setup techniques are described in detail below.

After one of the above setup techniques is performed, a determination then is made as to which type of cross-domain code authorization that the browser supports (box 160). If the browser supports static cross-domain code authorization, then either a callback technique or a polling technique can be used to exchange data between the website and the untrusted website domains (box 170). If the browser supports dynamic cross-domain code authorization, then a polling technique is used to exchange the data (box 180). The callback technique and the polling technique are discussed in detail below.

III. Operational Details

The details of the operation of embodiments of the secure cross-domain communication system 100 and method will now be discussed. Both the single website and the multiple website setup techniques will be discussed.

III. A Single Website

In general, the secure cross-domain communication system 100 and method uses a "throwaway" sub-domain to pass data from an untrusted website to a mashup website. This "throwaway" sub-domain is used only to retrieve information from that website. A user never sees this domain in the browser address bar, because it is used only by IFRAMEs. These frames are structured such that data can be safely downloaded from the untrusted website using a script tag. Note that none of the browser states associated with the mashup site (such as the user's authentication cookie, or the contents of a page) are ever accessible to the untrusted website.

III.A.1. Setup Phase

In order to create a cross-domain communication channel between the mashup website and the "throwaway" sub-domain, the secure cross-domain communication system 100 and method performs a setup technique that gives pages in both domains access to the same script object. This setup protocol is performed only once when the page is first loaded, and does not need to be restarted when further data requests are required.

Figure 2:
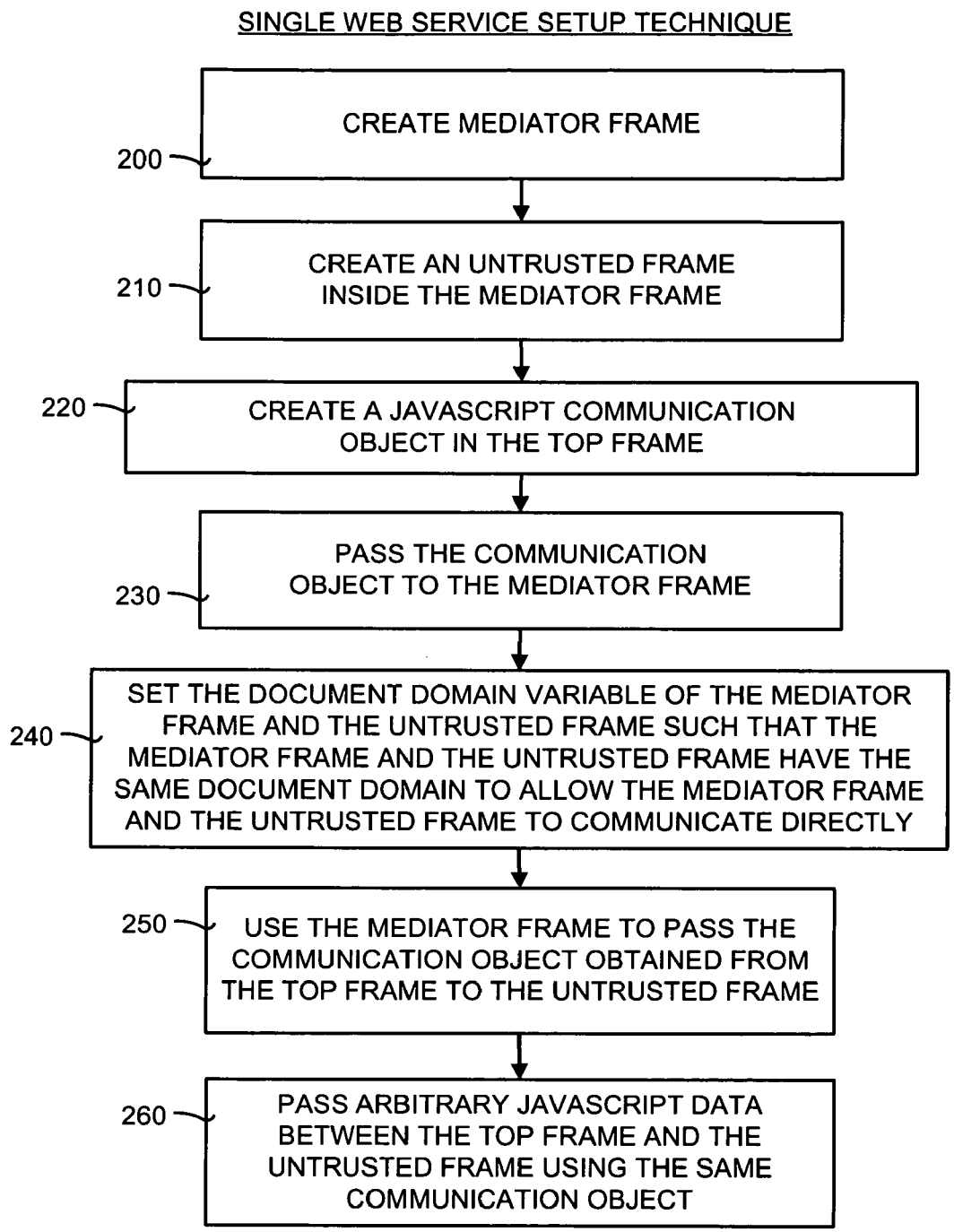
FIG. 2 is a flow diagram illustrating the details of the single website setup technique shown in FIG. 1.

FIG. 2 is a flow diagram illustrating the details of the single website setup technique shown in FIG. 1. In general, the single website setup technique of FIG. 2 uses "throwaway" subdomain to securely retrieve information from an untrusted website. In particular, the method begins by creating a mediator frame (box 200). It is assumed that the browser is at a location in the top frame on the mashup website. This mediator frame is a hidden IFRAME pointing to a tiny page on the mashup website. Next, an untrusted frame is created inside the mediator frame (box 210). A script communication object (such as a JavaScript® communication object) is created in the top frame (box 220). The communication object then is passed from the top frame to the mediator frame (box 230).

The document domain variable of the mediator frame and the document domain variable of the untrusted frame are set such that they both have the same document domain (box 240). Having the same document domain allows the mediator frame and the untrusted frame to directly communicate with each other. The mediator frame is used to pass the communication object obtained from the top frame to the untrusted frame (box 250). Then, arbitrary data (such as JavaScript® data) are passed between the top frame and the untrusted frame using the same communication object (box 260). This enables the top frame (on the mashup website) and the untrusted frame (in communication with the untrusted website) to communicate directly.

One security consideration to consider is that careless handling of direct script (such as JavaScript®) references obtained from untrusted parties can be dangerous. The recipient should perform appropriate security checks on the received communication object to ensure that getters and setters are not called when accessing properties of the object. Moreover, the recipient should validate primitive data using the "typeof" operator.

Figure 3:
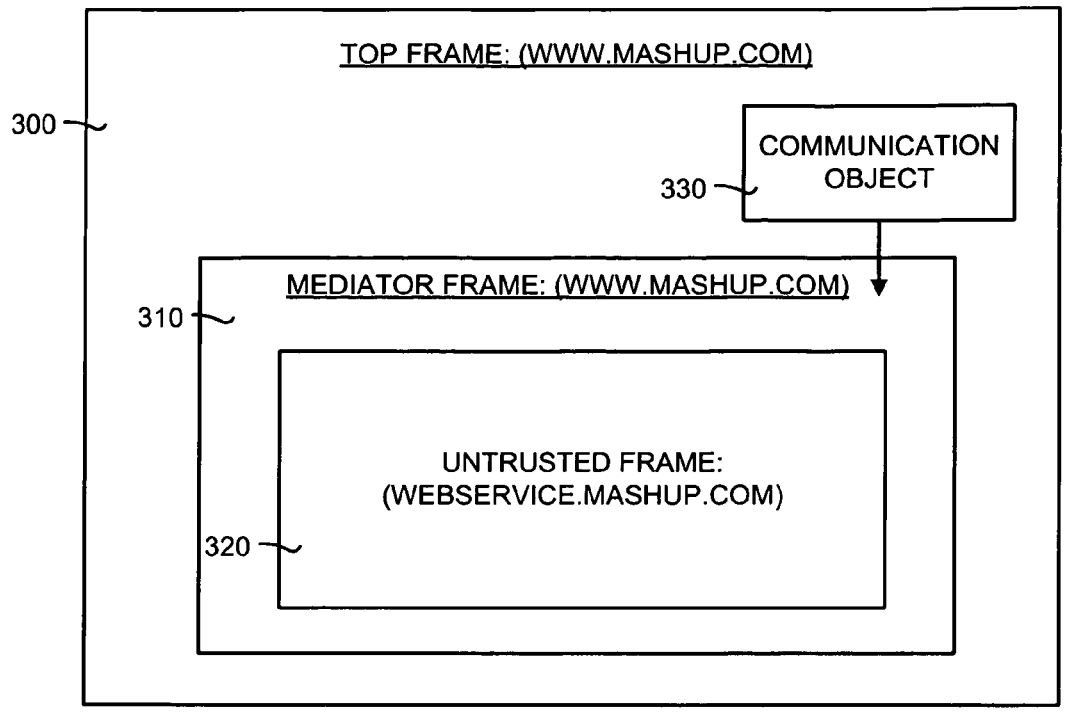
FIG. 3 is a block diagram illustrating an exemplary embodiment of a first phase of the single website setup technique shown in FIGS. 1 and 2.

FIG. 3 is a block diagram illustrating an exemplary embodiment of a first phase of the single website setup technique shown in FIGS. 1 and 2. In this example, there are three frames including a top frame 300 with the document.domain property of www.mashup.com, a mediator frame 310 with the document.domain property of www.mashup.com, and an untrusted frame 320 with document.domain property of web-service.mashup.com. The first step of retrieving data that is illustrated in FIG. 3 passes a communication object 330 from the top frame 300 to the mediator frame 310, as shown by the arrow from the communication object 330 to the mediator frame 310. At this point in the example, the top frame 300 and the mediator frame 310 are able to securely communicate with each other using the communication object 330. However, the top frame 300 and the untrusted frame 320 are still unable to communicate directly.

Figure 4:
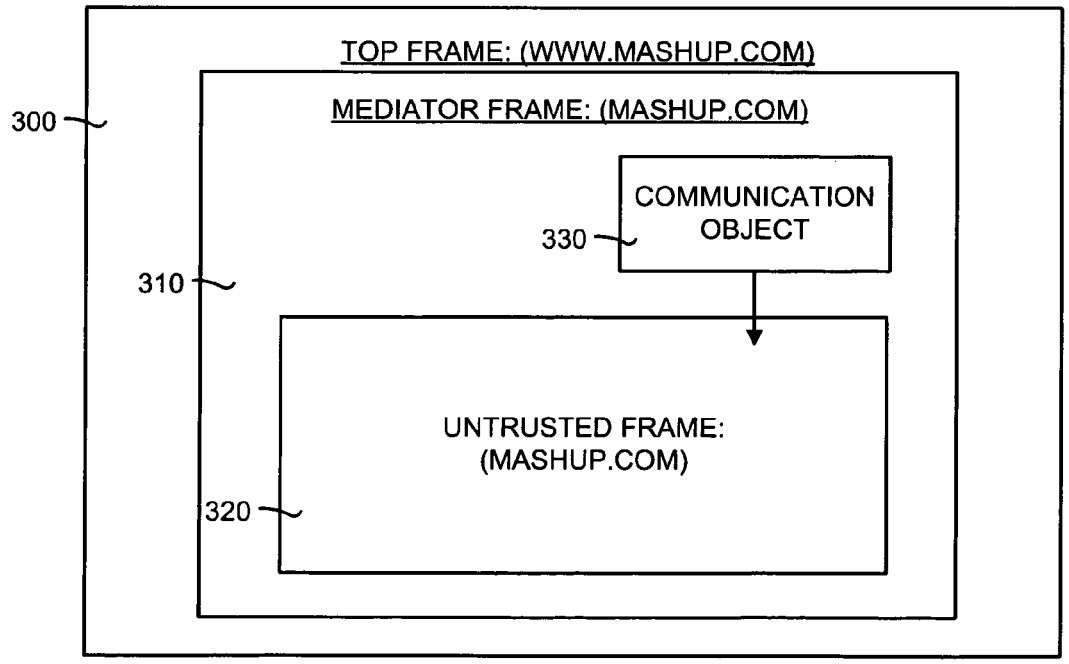
FIG. 4 is a block diagram illustrating an exemplary embodiment of a second phase of the single website setup technique shown in FIGS. 1, 2 and 3.

FIG. 4 is a block diagram illustrating an exemplary embodiment of a second phase of the single website setup technique shown in FIGS. 1, 2 and 3. In this second phase, the mediator frame 310 and the untrusted frame 320 have changed their document.domain property to the suffix mashup.com. This means that the mediator frame 310 and the untrusted frame 320 have the same document domain. Moreover, the communication object 330 has been passed from the mediator frame 310 to the untrusted frame 320, such that the top frame 300 now can securely communicate directly with the untrusted frame 320. This second phase can only occur after the mediator frame 310 and the untrusted frame 320 have changed their document.domain property to the same document domain (mashup.com).

At the end of this single website setup technique, the top frame 300 and the mediator frame 310 cannot directly communicate, because their document domains do not match. Moreover, browser security rules prevent the mediator frame 310 from returning to its previous domain of www.mashup.com, so the top frame 300 is securely protected from the mediator frame 310. Also, the mediator frame 310 cannot issue XMLHttpRequests to top.www.mashup.com, because it was served from www.mashup.com, so the cookie belonging to top.www.mashup.com is not accessible to the code hosted on the untrusted frame 320 at webservice.mashup.com.

III.A.2. Data Exchange Phase

Depending on the type of cross-domain code authorization supported by the browser, either a callback technique or a polling technique is used to exchange data securely between the top frame and the untrusted frame.

III.A.2.a. Callback Technique

If the user's browser supports a static authorization model for closures (as described above), then either a callback technique or a polling technique can be used to exchange data. In static authorization model, closure functions provide an easy communication mechanism between the top frame and the untrusted frame. One security consideration is that when invoking a callback function on browsers with a static authorization model, it is useful to do so using a "setTimeout" to ensure that no other callers can be called by the callee.

Figure 5:
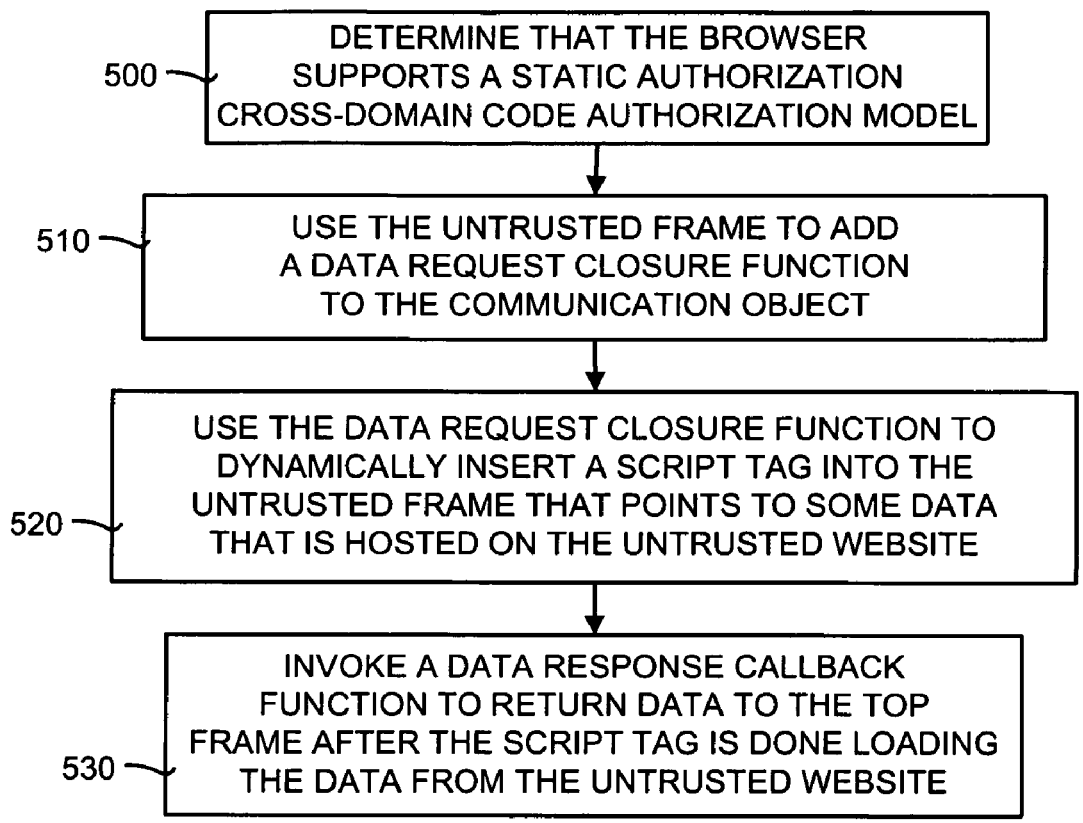
FIG. 5 is a flow diagram illustrating the details of the callback technique for data exchange shown in FIG. 1.

FIG. 5 is a flow diagram illustrating the details of the callback technique for data exchange shown in FIG. 1. The technique begins by determining that the browser supports a static authorization cross-domain code authorization model (box 500). Next, the untrusted frame is used to add a "data request" closure function to the communication object (box 510). The data request function is used to dynamically insert a script tag into the untrusted frame (box 520). This script tag points to some data in script format (such as a JavaScript® format) that is hosted on the untrusted website. In some embodiments, script is used to create an HTML script tag and the HTML script tag is appended to a document in the throwaway sub-domain. The data request closure function then takes a "data response" callback as an argument and is called when the mashup website needs to request information from the untrusted website. The top frame then creates the data response callback, which takes the data as an argument and will perform operations to respond to the completed request. When the script tag is done loading data from the untrusted website, it invokes data response callback to return that data to the top frame (box 530).

III.A.2.b. Polling Technique

If the user's browser supports a dynamic authorization model for closures (as described above), then a polling technique can be used to exchange data. Unfortunately, the dynamic authorization model does not support this callback technique. The callback would run with the security privileges of the page that is calling it, not the security privileges of the page that created it.

The polling technique catches the security exception that is thrown when an unauthorized access occurs, and fall back on polling a property of script object using the setinterval script function. Once data is ready, it can be read by the other party. This type of client-side polling does not involve any network requests, and it can be performed efficiently with a short waiting interval.

Figure 6:
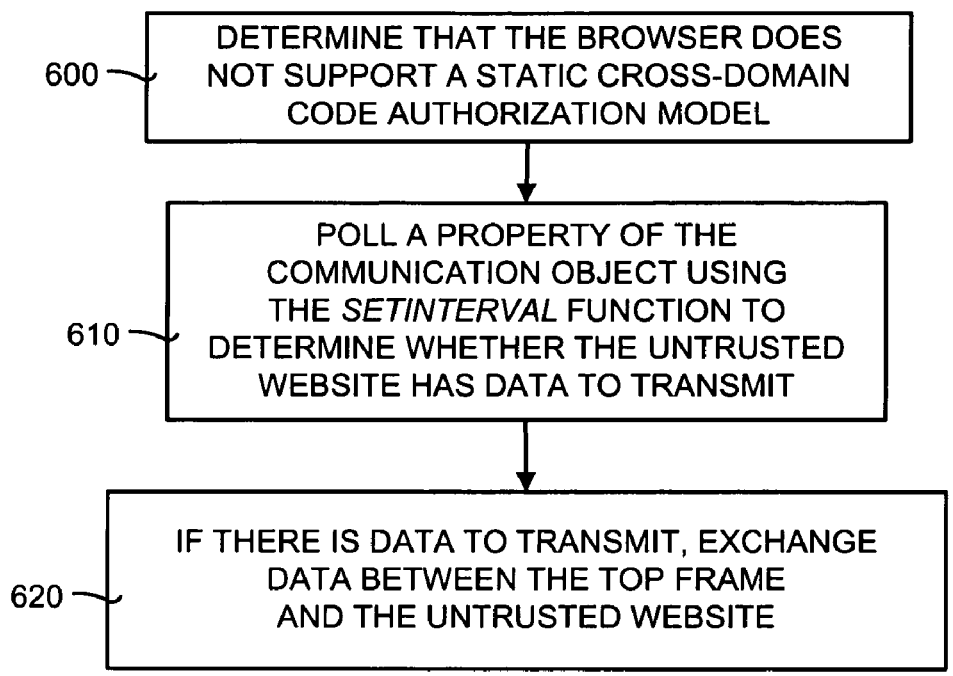
FIG. 6 is a flow diagram illustrating the details of the polling technique for data exchange shown in FIG. 1.

FIG. 6 is a flow diagram illustrating the details of the polling technique for data exchange shown in FIG. 1. The polling technique begins by determining that the browser does not support a static cross-domain code authorization model (box 600). Then technique then polls a property of the communication object using the setinterval function (box 610). This polling determines whether the untrusted website has any data to transmit. If there is data to transmit, then the data is exchanged between the top frame and the untrusted website (box 620).

III.B Multiple Websites

The single website setup technique described above is appropriate for the situation where the mashup is only interacting with a single untrusted website. If the mashup interacts with more than one website or gadget, it not only needs to protect the security of its own domain, but it also needs to keep these websites from compromising each other.

Unfortunately, because the untrusted frame for every website lives in the mashup website's domain (for example, mashup.com), an attacker's untrusted frame might be able to interfere with the untrusted frame of another website. This would corrupt the communication channel established by the secure cross-domain communication system and the method and any data that being passed through. Whether or not this issue is a problem is depends on the frame restrictions imposed by the browser, as described above.

FIG. 7 is a table illustrating an exemplary embodiment of browser configurations and the server communication techniques that they can safely support. Knowing which browser is being used and the models it supports helps the secure cross-domain communication system and method know which techniques to implement and perform. This information is embodied in the table of FIG. 7. It should be noted that other browsers other than those browsers shown may be used, and the type of techniques used depend on which communication models they support.

III.B.1. Restrictive Cross-Domain Frame Access

If the browser has a restrictive cross-domain frame access that restricts access to cross-domain frames when navigating the frame hierarchy, then the single website setup technique described above can be directly adapted to multiple untrusted websites. This setup technique is a top-mediator untrusted (TMU) setup technique. The general idea for the TMU setup technique is that a new nested frame structure is created for each website or gadget that needs to be included. The untrusted websites are nested inside sibling frames that cannot be accessed because the frames property of the main window is in the mashup website domain (such as www.mashup.com) and the untrusted website domains are not.

Figure 8:
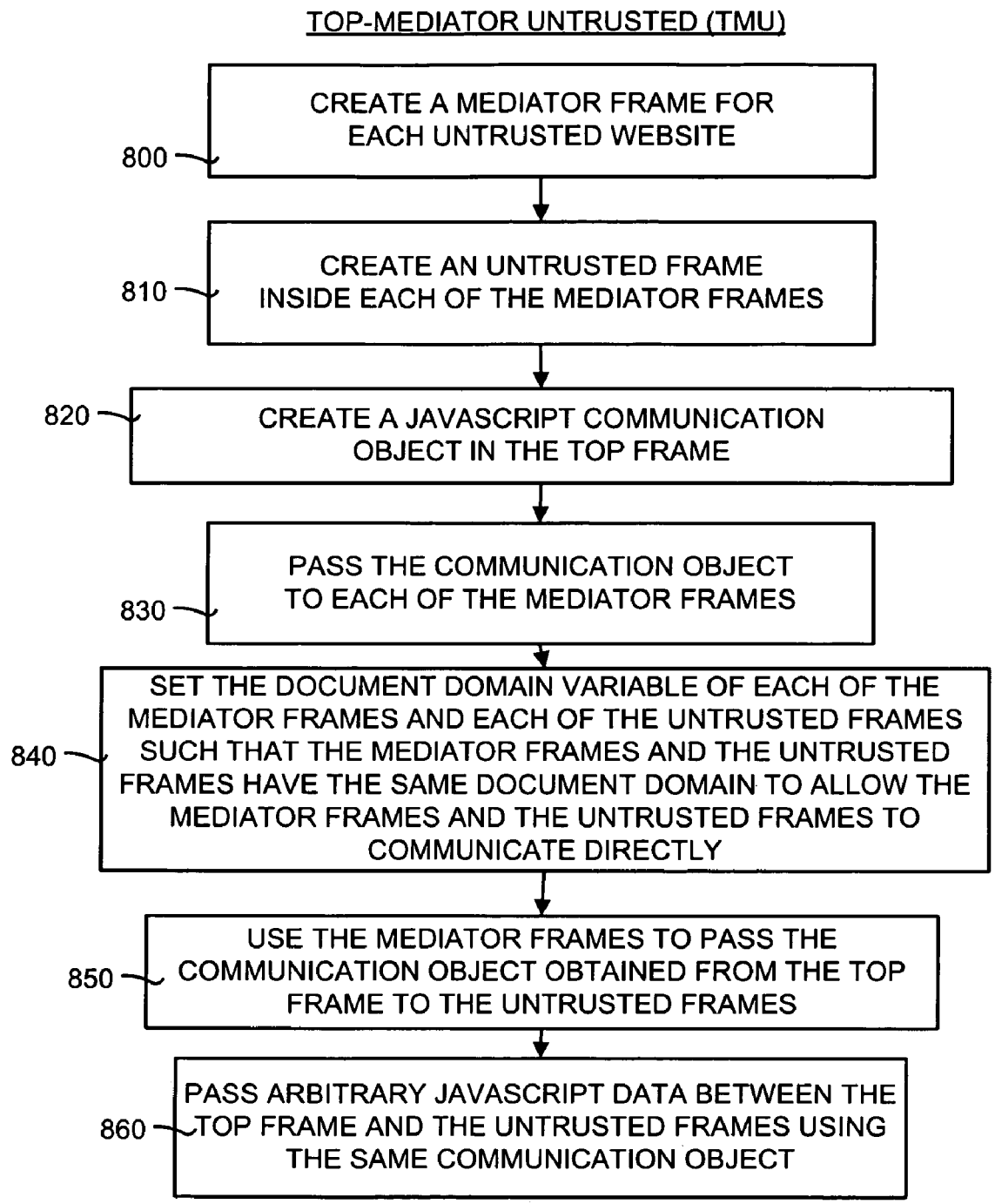
FIG. 8 is a flow diagram illustrating the details of the top-mediator untrusted (TMU) setup technique shown in FIG. 1.

FIG. 8 is a flow diagram illustrating the details of the top-mediator untrusted setup (TMU) technique shown in FIG. 1. The TMU technique begins by creating a mediator frame for each untrusted website (box 800). The technique then creates an untrusted frame inside each of the mediator frames (box 810). A script communication object (such as JavaScript® communication object) then is created in the top frame (box 820). This communication object is passed to each of the mediator frames (box 830).

The technique then sets the document domain variable of each of the mediator frames and each of the untrusted frames to the same document domain (box 840). This allows the mediator frames and the untrusted frames to securely communicate directly with each other. The mediator frame then is used to pass the communication object obtained from the top frame to the untrusted frame (box 850). Arbitrary data (such as JavaScript® data) then can be passed between the top frame and the untrusted frames using the same communication object (box 860).

Figure 9:
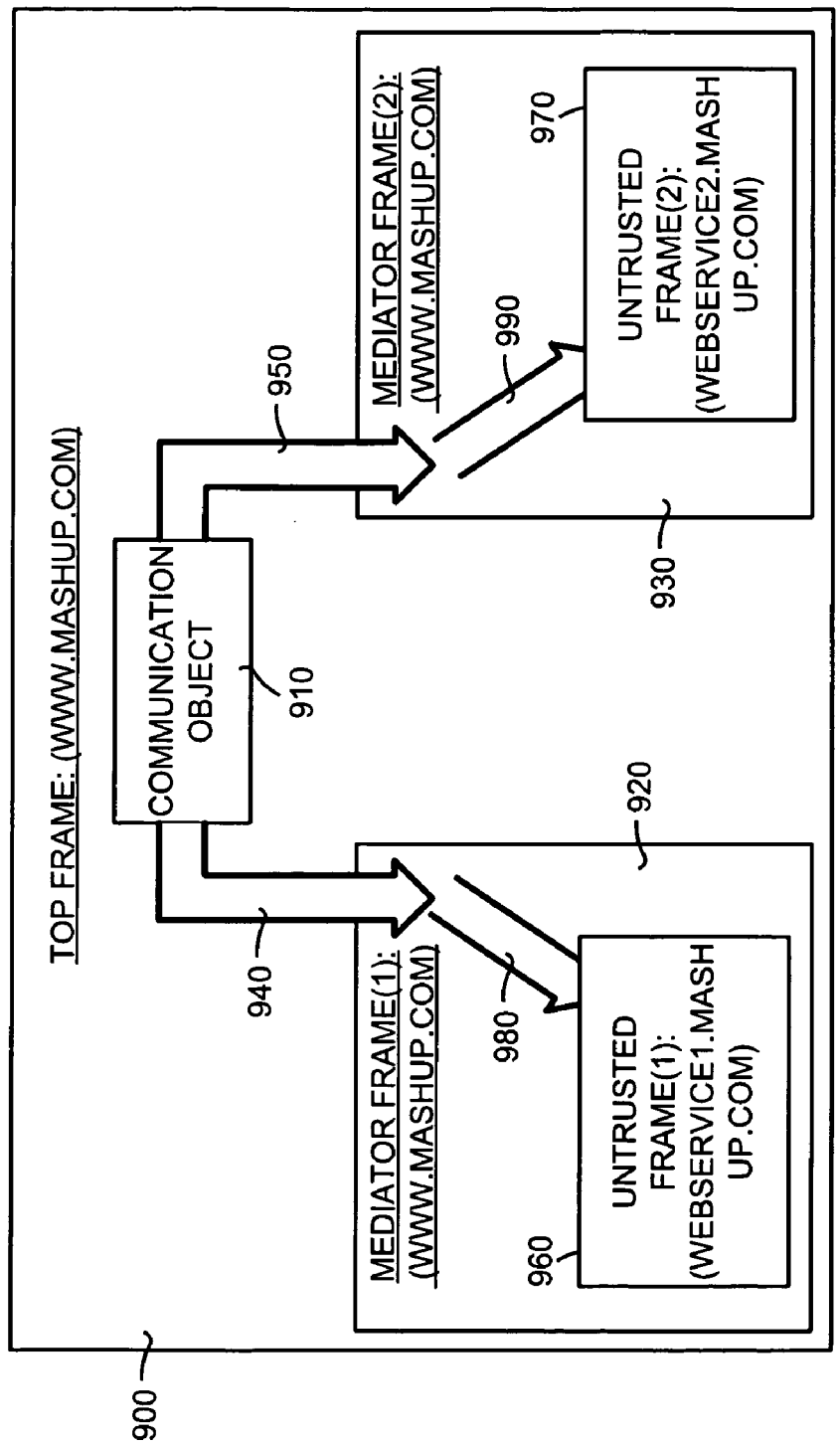
FIG. 9 is a block diagram illustrating an exemplary embodiment of the TMU setup technique shown in FIGS. 1 and 8.

FIG. 9 is a block diagram illustrating an exemplary embodiment of the TMU setup technique shown in FIGS. 1 and 8. In this example, the top frame 900 has a document.domain property of www.mashup.com. A communication object 910 is passed from the top frame 900 to a first mediator frame 920 having a document.domain property of www-.mashup.com, and a second mediator frame 930 having a document.domain property of www.mashup.com. A first arrow 940 shows the transfer of the communication object 910 from the top frame 900 to the first mediator frame 920, and a second arrow 950 shows the transfer from the top frame 900 to the second mediator frame 930.

A first untrusted frame 960 is created inside the first mediator frame 920 and has a document.domain property of www.webservice1.mashup.com. Similarly, a second untrusted frame 970 is created inside the second mediator frame 930 and has a document.domain property of www.webservice2.mashup.com. The document domain variable of the first untrusted frame 960 and the first mediator frame 920 are set to the same document domain (such as mashup.com, which is not shown) and the second untrusted frame 970 and the second mediator frame 930 are set to the same document domain (such as mashup.com) such that the first untrusted frame 960 and the first mediator frame 920 can securely communicate directly with each other and the second untrusted frame 970 and the second mediator frame 930 can securely communicate directly with each other.

A third arrow 980 illustrates that the first mediator frame 920 passes the communication object 910 to the first untrusted frame 960. A fourth arrow 990 shows that the second mediator frame 930 pass the communication object 910 to the second untrusted frame 970. In this manner the top frame can securely communicate with the first untrusted frame 960 and the second untrusted frame 970.

III.B.2. Permissive Cross-Domain Frame Access

In order to work properly for the majority of browsers, the secure cross-domain communication system and method also support the permissive frame access configuration. As shown in FIG. 7, the permissive frame access is used in Firefox®, Safari®, Internet Explorer® 7, and some configurations of Internet Explorer®6. This configuration makes separating gadgets much more difficult, because any frame anywhere on the page can be reached by any other frame, and if those frames are in the same domain, they can each access each other and intercept each other's communications.

In order to keep these frames from interfering with each other, the secure cross-domain communication system and method uses a throwaway domain for each website with which the mashup website interacts. For example, if the mashup needs to include two websites, it might use webservice1.mashup.com and webservice2.mashup.com. The solution is to use the top-untrusted access (TUA) setup technique.

Figure 10:
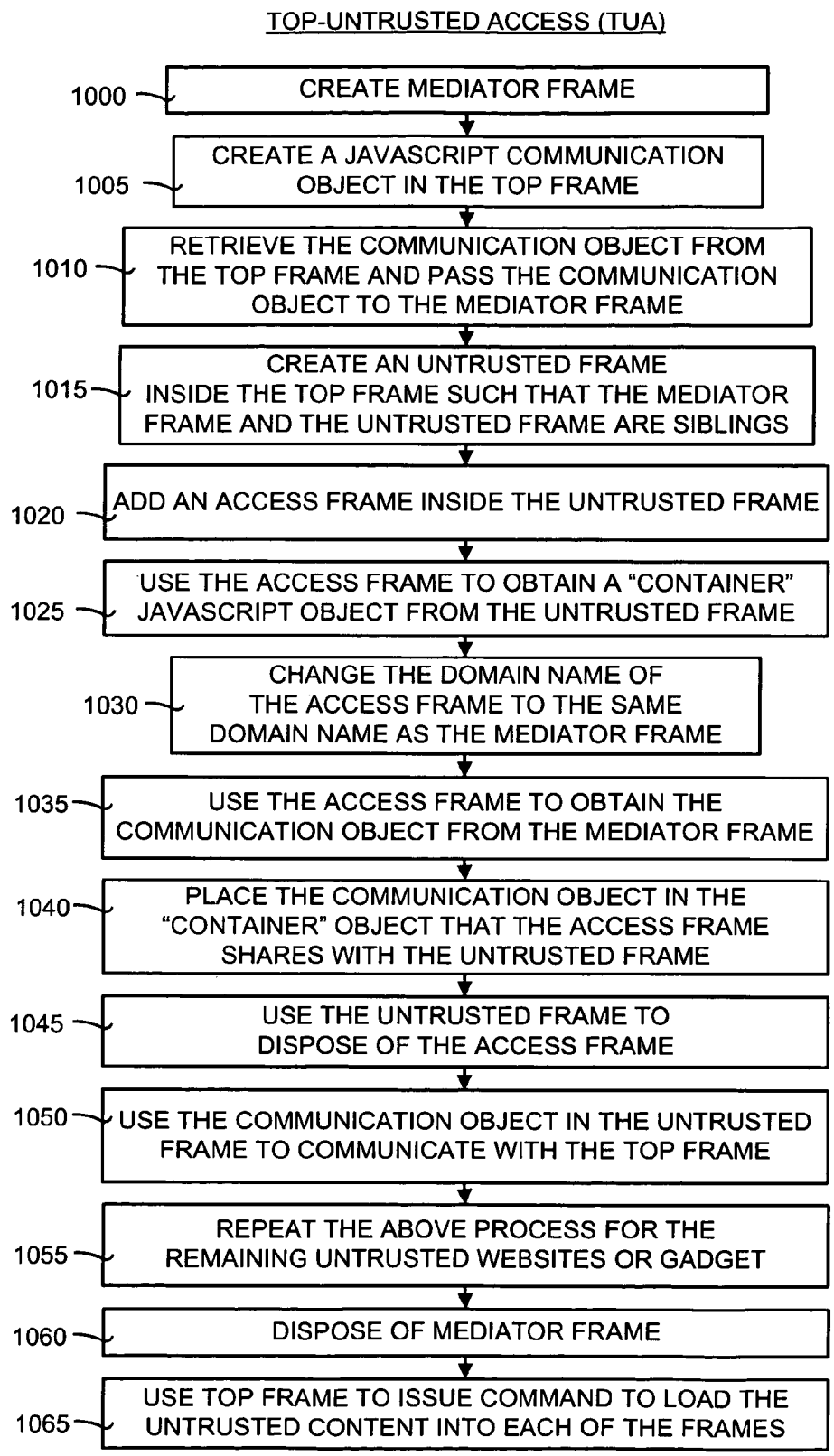
FIG. 10 is a flow diagram illustrating the details of the top-untrusted access (TUA) setup technique shown in FIG. 1.

FIG. 10 is a flow diagram illustrating the details of the top-untrusted access (TUA) setup technique shown in FIG. 1. If it is assumed that the browser is in the top frame, the TUA technique begins by creating a mediator frame (box 1000). A script communication object (such as a JavaScript® communication object) is created in the top frame (box 1005). The communication object is retrieved from the top frame and passed to the mediator frame (box 1010).

Next, an untrusted frame is created inside the top frame such that the mediator frame and the untrusted frame are siblings (box 1015). An access frame then is added inside the untrusted frame (box 1020). The access frame is used to obtain a "container" script object (such as a JavaScript® object) from the untrusted frame (box 1025). The domain name of the access frame is changed to the same domain name as the mediator frame (box 1030).

The access frame is used to obtain the communication object from the mediator frame (box 1035). The communication object is placed in the "container" object that the access frame shares with the untrusted frame (box 1040). The untrusted frame then is used to dispose of the access frame (box 1045). The technique then uses the communication object in the untrusted frame to communicate with the top frame (box 1050). In this manner, the top frame is able to securely communicate directly with the untrusted frame. The above process is repeated for the remaining untrusted websites or gadgets (box 1055). The technique then disposes of the mediator frame (box 1060), and uses the top frame to issue a command to load the untrusted content from each of the untrusted websites into each of the frames of the mashup (box 1065).

Figure 11:
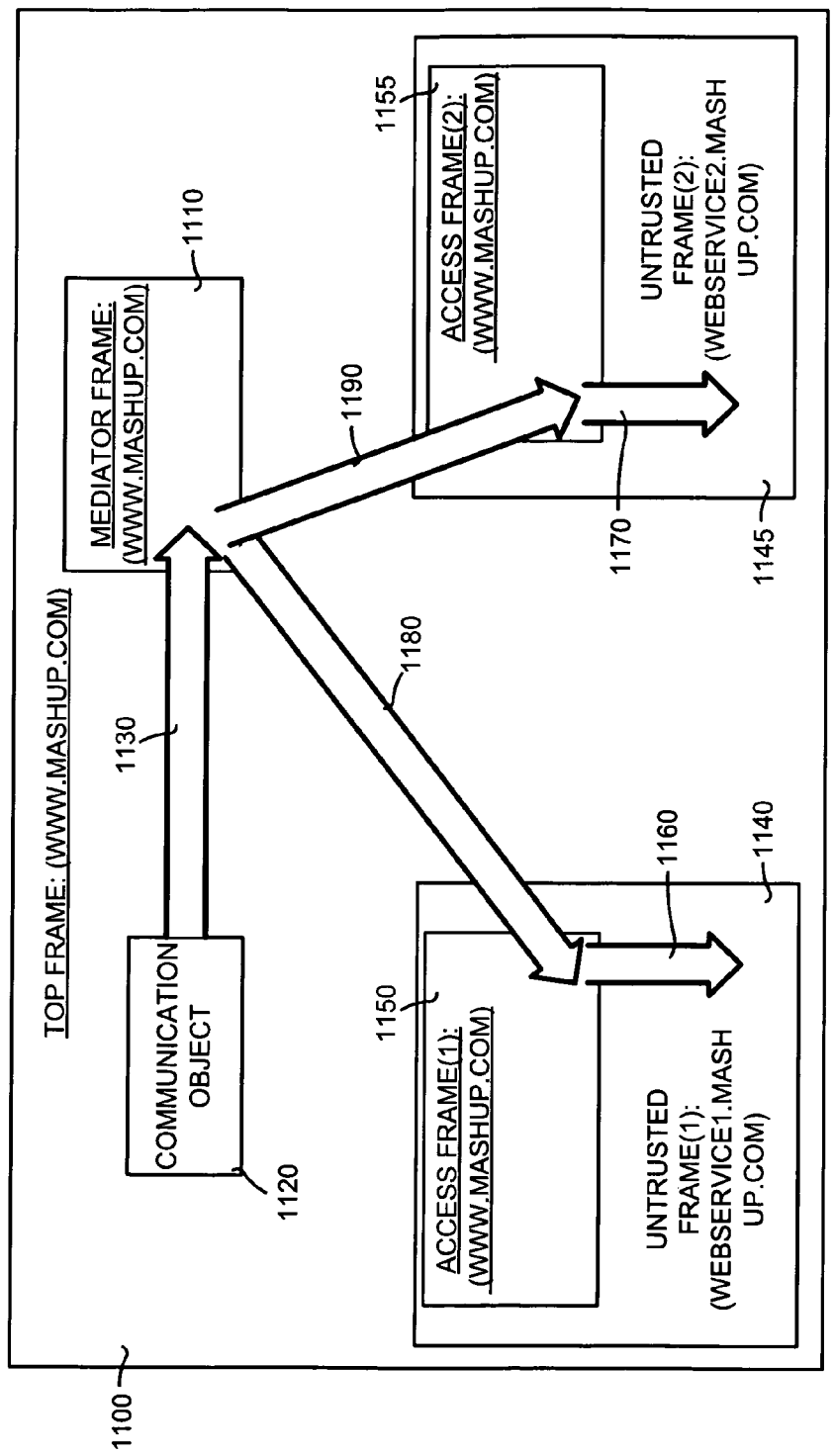
FIG. 11 is a block diagram illustrating an exemplary embodiment of the TUA setup technique shown in FIGS. 1 and 10.

FIG. 11 is a block diagram illustrating an exemplary embodiment of the TUA setup technique shown in FIGS. 1 and 10. In this example, a top frame 1100 has a document.domain property of www.mashup.com. The browser is located on the top frame. A mediator frame 1110 (which is an IFRAME) is created having document.domain property of www.mashup.com. This mediator frame 1110 points to a tiny page on the top frame. A communication object 1120 then is retrieved by the mediator frame 1110 from the top frame 1100. A first arrow 1130 indicates that the communication object 1120 is passed from the top frame 1100 to the mediator frame 1110. The mediator frame 1110 then changes its domain to mashup.com.

A first untrusted frame 1140 and a second untrusted frame 1145 are created inside the top frame having a document.domain properties of webservice1.mashup.com and webservice1.mashup.com, respectively. Rather than locating the first untrusted frame 1140 and the second untrusted frame 1145 inside the mediator frame 1110, the first untrusted frame 1140 and the second untrusted frame 1145 are located inside the top frame 1100. Thus, the mediator frame 1110, the first untrusted frame 1140, and the second untrusted frame are siblings.

A first access frame 1150 then is added inside the first untrusted frame 1140 and a second access frame 1155 is added inside the second untrusted frame 1145. The first access frame 1150 obtains a "container" script object from the first untrusted frame 1140, as shown by a second arrow 1160. Similarly, the second access frame 1155 obtains a "container" script object from the second untrusted frame 1145, as shown by a third arrow 1170. The first access frame 1150 and the second access frame 1155 then change their domain to mashup.com (the same domain as the mediator frame 1110). Due to the browser's permissive frame access policy, the first access frame 1150 and the second access frame 1155 can get a handle on the mediator frame 1110. Because the mediator frame 1110 and both the access frames 1150, 1155 are in the mashup.com domain, the access frames 1150, 1155 can obtain the communication object 1120 from the mediator frame 1110. This transfer from the mediator frame 1110 to the first access frame 1150 is indicated by a fourth arrow 1180, and the transfer from the mediator frame 1110 to the second access frame 1155 is indicated by a fifth arrow 1190. The access frames 1150, 1155 place this object into the container it shares with their respective untrusted frames 1140, 1145.

At this point, the untrusted frames 1140,1145 dispose of their respective access frames 1150, 1155, which are no longer needed. This is because the untrusted frames 1140, 1145 now have the communication object 1120 they need to communicate with the top frame 1100. This process is repeated for every untrusted website that will be included in the web mashup. Although FIG. 11 only illustrates 2 untrusted websites, the TUA setup technique also works for more than two untrusted websites. At the end of this setup process, the mediator frame 1110 is no longer needed and is eliminated. At this point in the setup process, all the untrusted websites have a communication channel to the top frame 1100, but none of them have access to each other. Since the setup phase is complete, the top frame can safely issue the command to load the untrusted content (such as cross-domain script tags) into each of the frames.

III.B.3. Setup Integrity

The TUA setup technique described above relies on the assumption that the untrusted code does not run until all communication channels have been securely initialized. Setup integrity is not necessary for protecting the user's authorization credentials at the untrusted website, but it is necessary for protecting each individual gadget's communications with the parent page from interference or interception by other gadgets.

An example attack on setup integrity would be for webservice1.mashup.com to open a popup window and stash some malicious code there to retain control over the browser session. The attacker would then restart the initialization process in the original window by resetting its location, making it appear to the mashup site that the user is arriving at the site for the first time:

opener.location="about:blank";
opener.location="http://top.www.mashup.com/";

During the second initialization process, the popup could try to find the mediator and access frames and maliciously modify them, potentially corrupting the communication channel.

To prevent this class of attacks, a mashup could ensure that the domain used to communicate is different from one page load to the next. On the second visit, the main frame would redirect to a fresh domain (such as top.www.2.mashup.com). The untrusted websites would be located at webservice1.2.mashup.com and webservice2.2.mashup.com. The number of visits would be tracked in a session cookie that expires when the browser is closed. Also, the gadget aggregator would need to reload the page to restart the setup process if more websites or gadgets need to be added beyond the ones that were created during the first setup phase.

Another (more cumbersome) approach to solve this problem would be to use public key cryptography to protect communications between gadgets over the communication channel. To summarize, setup integrity enforcement may only be used for mashups with untrusted gadgets from more than one source, where the browser has a permissive frame architecture, and gadgets are communicating client-side information with their parent that needs to be protected from interception or interference by other gadgets. For gadgets that only communicate non-sensitive information (such as desired height) on the client side, setup integrity enforcement may not be required.

III.C Other Embodiments

In general, each website can have at most two persistent HTTP connections from the browser to the server open at a time. If a website wants more connections, it can create a second website. This makes a larger quota of network connections available. However, the browser's same-origin security policy prevents pages from the two websites from passing data back and forth within the browser. Moreover, websites that have set their document.domain cannot issue further XMLHttpRequests.

Some embodiments of the secure cross-domain communication system 100 and method can be used to bypass this per-site HTTP connection limit in browsers. Since these embodiments of the secure cross-domain communication system 100 and method allow different sub-domains that have not set their document.domain to communicate, data can be passed between two websites without limiting their ability to issue XMLHttpRequests.

IV. Exemplary Operating Environment

Embodiments of the secure cross-domain communication system 100 and method are designed to operate in a computing environment. The following discussion is intended to provide a brief, general description of a suitable computing environment in which the secure cross-domain communication system 100 and method may be implemented.

Figure 12:
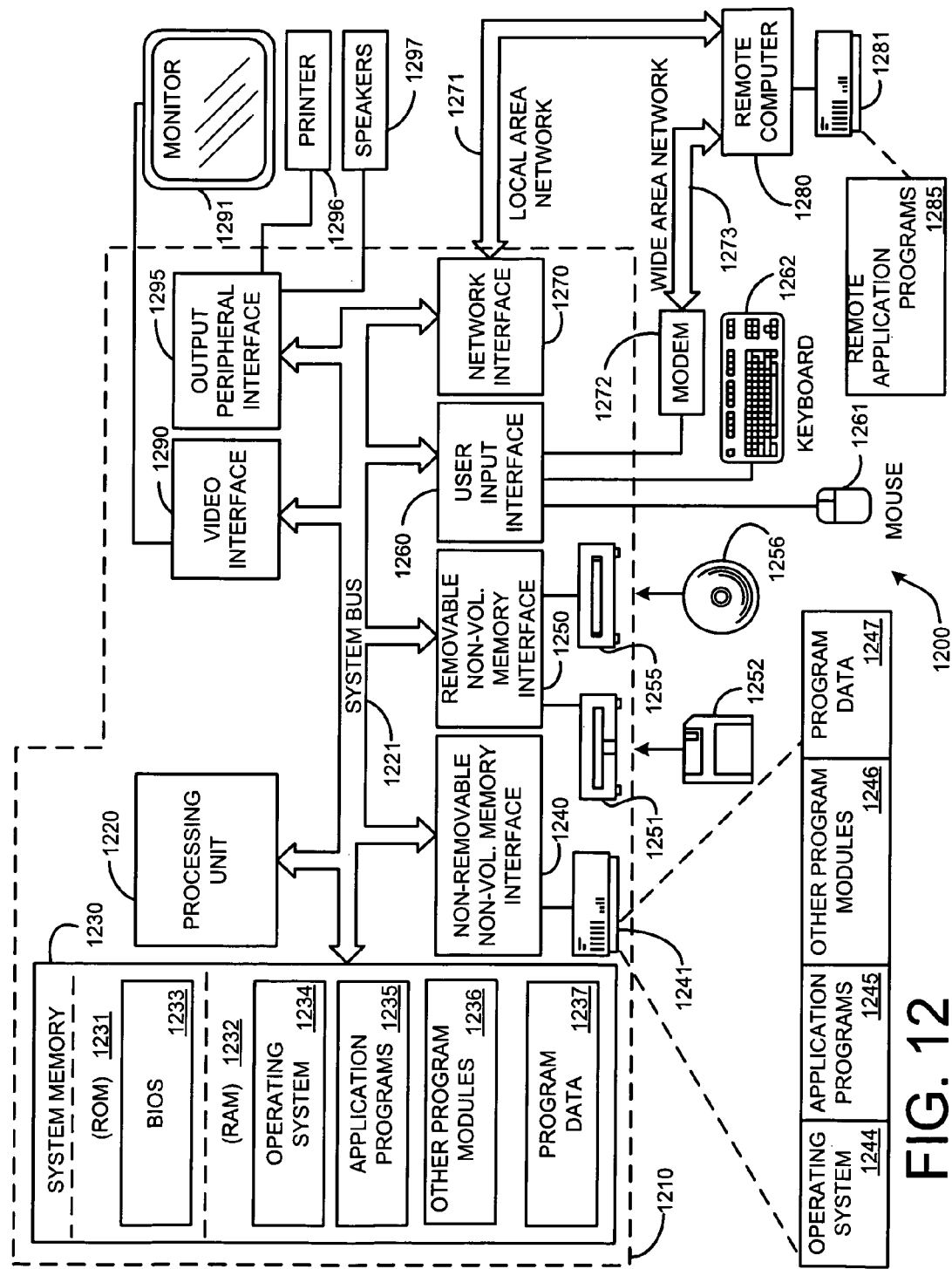
FIG. 12 illustrates an example of a suitable computing system environment in which embodiments of the secure cross-domain communication system and method shown in FIGS. 1-11 may be implemented.

FIG. 12 illustrates an example of a suitable computing system environment in which the secure cross-domain communication system and method shown in FIGS. 1-11 may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment.

The secure cross-domain communication system 100 and method is operational with numerous other general purpose or special purpose computing system environments or configurations. Examples of well known computing systems, environments, and/or configurations that may be suitable for use with the secure cross-domain communication system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The secure cross-domain communication system 100 and method may be described in the general context of computer-executable instructions, such as program modules, being executed by a computer. Generally, program modules include routines, programs, objects, components, data structures, etc., that perform particular tasks or implement particular abstract data types. The secure cross-domain communication system 100 and method may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for the secure cross-domain communication system 100 and method includes a general-purpose computing device in the form of a computer 1210.

Components of the computer 1210 may include, but are not limited to, a processing unit 1220 (such as a central processing unit, CPU), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer readable media. Computer readable media can be any available media that can be accessed by the computer 1210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1210. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within the computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information (or data) into the computer 1210 through input devices such as a keyboard 1262, pointing device 1261, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1220 through a user input interface 1260 that is coupled to the system bus 1221, but may be connected by other interface and bus structures, such as, for example, a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for communicating between a website and an untrusted website to create a web mashup on the website, comprising:
    setting a domain property of the website and a domain property of the untrusted website to a same document domain to allow direct communication between the untrusted website and the website;
    creating a mediator frame that points to a page on the website;
    creating an untrusted frame that points to a throwaway sub-domain; and
    passing data between the website using the mediator frame and the untrusted website using the untrusted frame to create the web mashup on the website.

2. The method of claim 1, further comprising:
    determining that the web mashup uses a single website that is the untrusted website; and
    using script to create an HTML script tag and appending the HTML script tag to a document in the throwaway sub-domain.

3. A method for communicating between a website and an untrusted website to create a web mashup on the website, comprising setting a document domain variable of a mediator frame that points to a page on the website and an untrusted frame that points to a throwaway sub-domain to a same document domain to allow the mediator frame and the untrusted frame to communicate directly and pass data from the untrusted website to the website and create the web mashup on the website.

4. The method of claim 1, further comprising:
    determining that the web mashup uses multiple websites such that the untrusted website includes the multiple websites; and
    determining which type of domain frame access a browser of the website uses.

5. A method for communicating between a website and at least one untrusted website to create a web mashup on the website, comprising:
    creating a mediator frame for each untrusted website;
    creating an untrusted frame inside each of the mediator frames; and
    setting a domain property of the mediator frame and a domain property of the untrusted frame to a same document domain to allow the mediator frame and the untrusted frame to communicate directly and pass data from the untrusted website to the website and create the web mashup on the website.

6. The method of claim 5, further comprising:
    determining that a browser uses a restrictive domain frame access;
    setting a document domain variable of each of the mediator frames and each of the untrusted frames such that the mediator frames and the untrusted frames have the same document domain to allow the mediator frames and the untrusted frames to communicate directly; and
    passing arbitrary script data between a top frame and each of the untrusted frames.

7. The method of claim 4, further comprising determining that the browser uses a permissive domain frame access.

8. The method of claim 7, further comprising:
    creating the untrusted frame inside a top frame such that the mediator frame and the untrusted frame are siblings;
    adding an access frame inside the untrusted frame; and
    using the access frame to obtain a "container" script object from the untrusted frame.

9. The method of claim 8, further comprising:
    setting a document domain variable of the mediator frame and the access frame such that the mediator frame and the access frame have the same document domain to allow the mediator frame and the access frame to communicate directly;
    placing a script communication object in the "container" script object that the access frame shares with the untrusted frame;
    using the untrusted frame to dispose of the access frame; and
    using the script communication object in the untrusted frame to communicate with the top frame.

10. The method of claim 9, further comprising: disposing of the mediator frame.

11. The method of claim 1, further comprising:
    determining which type of domain code authorization a browser on the website uses; and
    exchanging data between the website and the untrusted website based on the type of domain code authorization of the browser.

12. The method of claim 11, further comprising:
    determining that the browser uses a static type of domain code authorization; and
    using a callback technique or a polling technique to exchange data between the website and the untrusted website.

13. The method of claim 11, further comprising:
    determining that the browser uses a dynamic type of domain code authorization; and
    using a polling technique to exchange data between the website and the untrusted website.

* * * * *